May 8, 1962

R. L. WEEKLY 3,033,303

SELF-PROPELLED PLATFORM VEHICLE FOR
HARVESTING LOW GROWING CROPS

Filed June 22, 1959

Robert L. Weekly
INVENTOR.

BY *Lawrence A. O'Brien*
*and Harvey B. Jacobson*
Attorneys

May 8, 1962
R. L. WEEKLY
3,033,303
SELF-PROPELLED PLATFORM VEHICLE FOR
HARVESTING LOW GROWING CROPS
Filed June 22, 1959
4 Sheets-Sheet 2
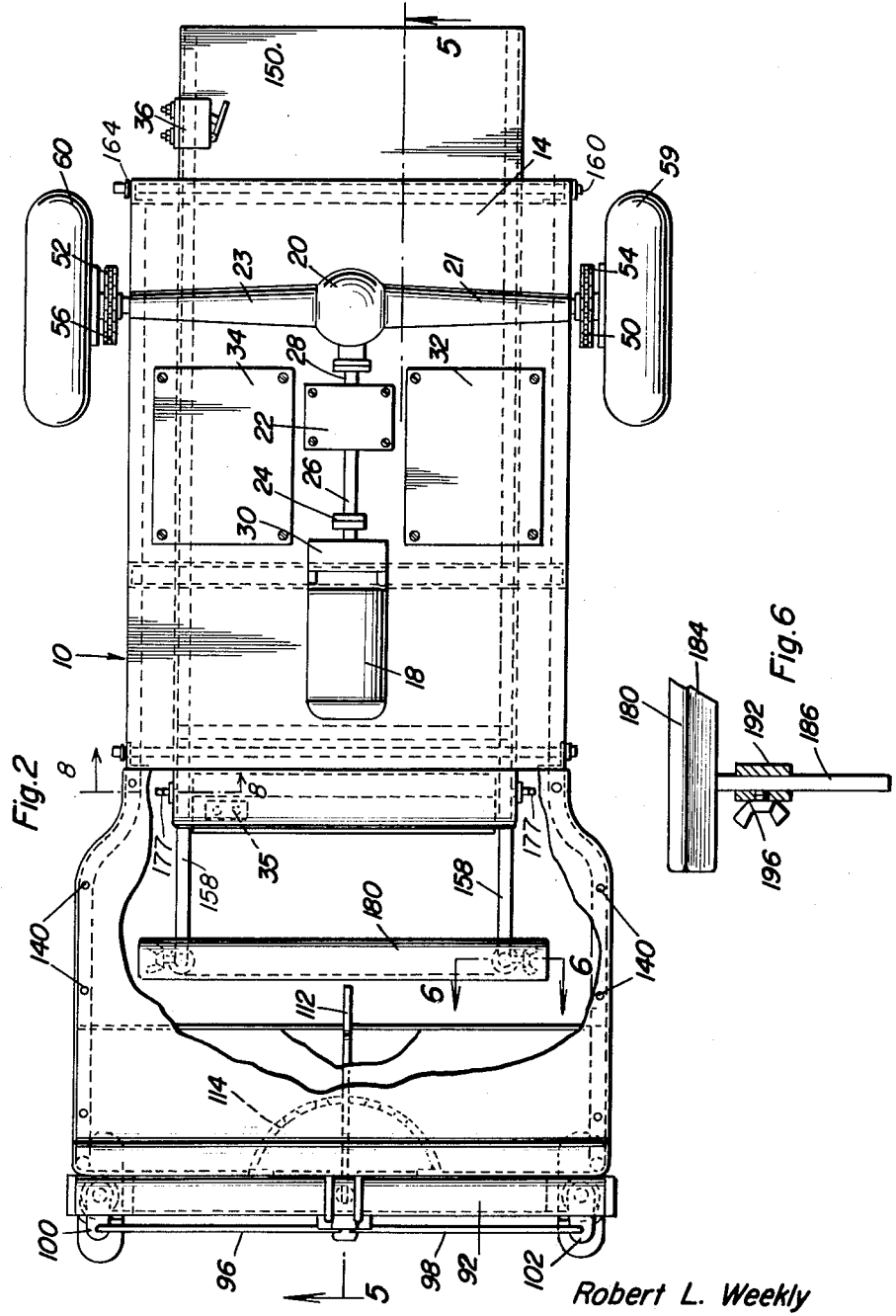
Robert L. Weekly
INVENTOR.
BY *Clarence A. O'Brien*
*and Harvey B. Jacobson*
Attorneys

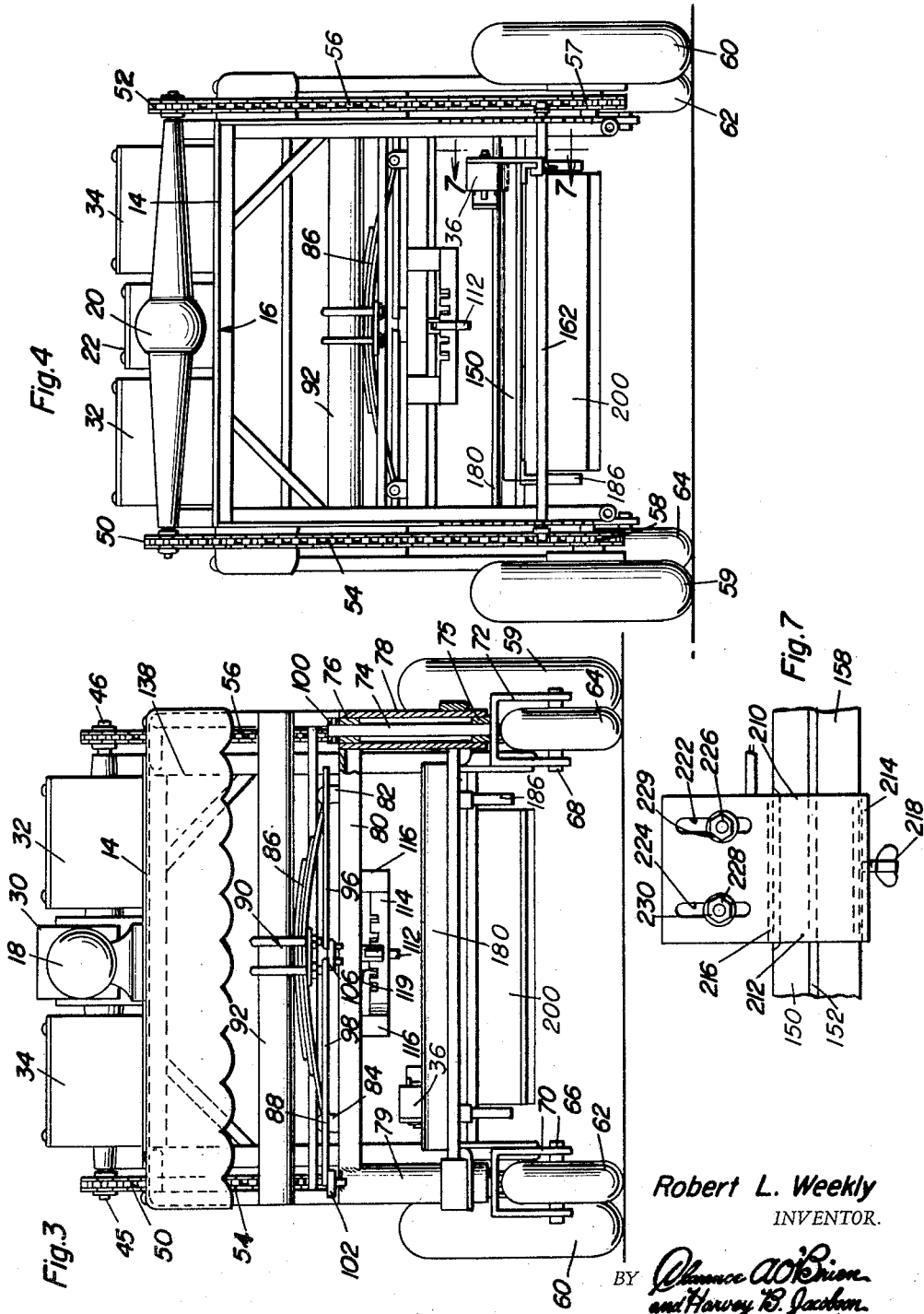

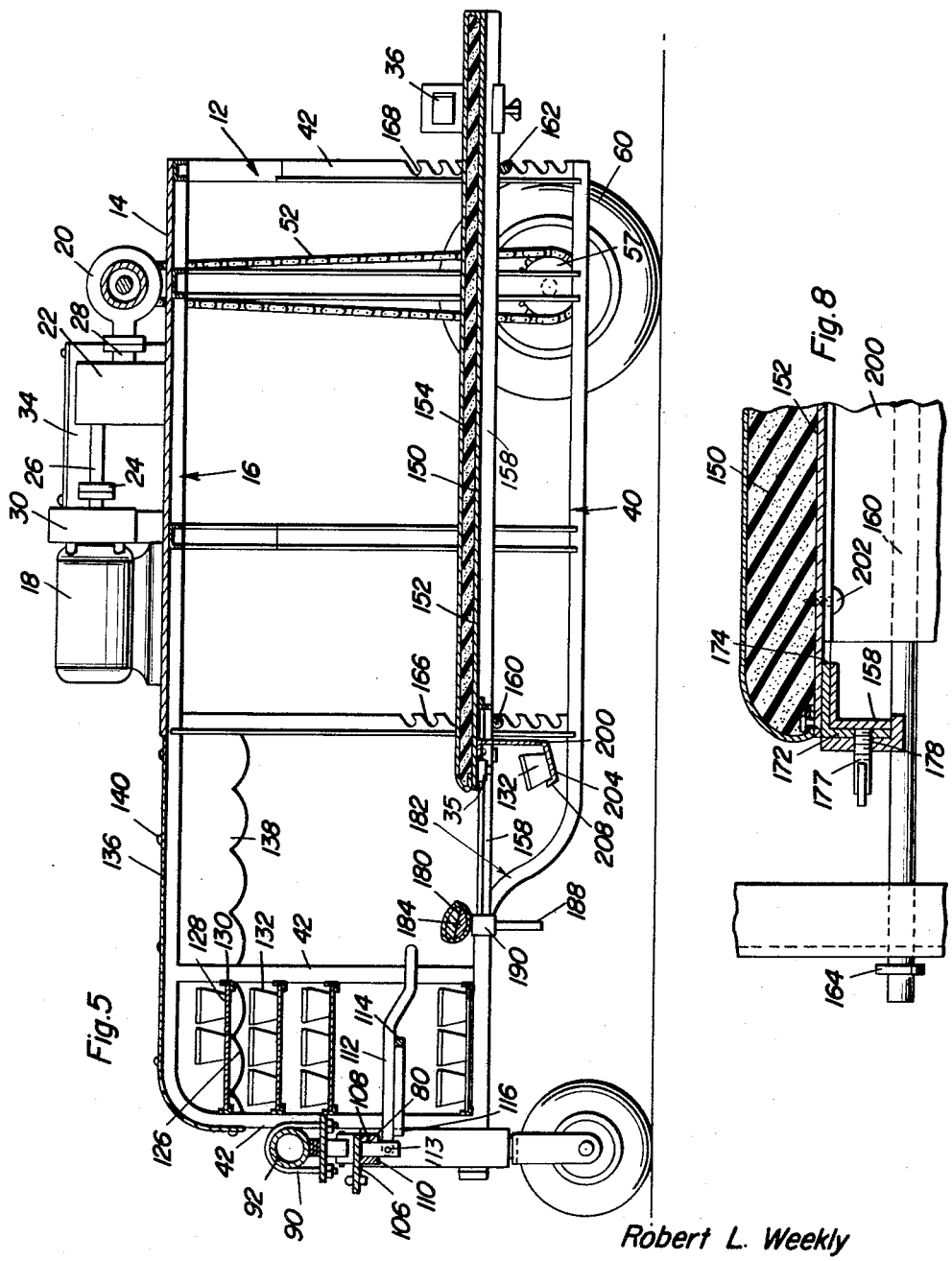

United States Patent Office 3,033,303
Patented May 8, 1962

3,033,303
SELF-PROPELLED PLATFORM VEHICLE FOR HARVESTING LOW GROWING CROPS
Robert L. Weekly, Rte. 1, North Benton, Ohio
Filed June 22, 1959, Ser. No. 821,905
6 Claims. (Cl. 180—65)

This invention relates to harvesting and more particularly to a vehicle which facilitates weeding, transplanting and the harvesting of low growing crops.

An object of the invention is to provide a self-propelled vehicle which materially facilitates the manual harvesting of low growing crops, for instance, strawberries. Although strawberries are mentioned, it is to be clearly understood that practically any low growing crop may be harvested more easily by means of a vehicle constructed in accordance with the invention. Although automatic harvesting equipment has been developed in the past, there are still some crops which either cannot or which are not satisfactorily harvested by the automatic equipment, still requiring manual picking. It is with this class of crop that the vehicle in accordance with this invention provides certain improvements insofar as harvesting is concerned.

Briefly, the vehicle is a self-propelled vehicle having a steering mechanism at one end by which to steer the vehicle in the field and having an adjustably mounted platform on which the picker may lie while the vehicle is propelled through a field. Full control of the operation of the vehicle is with the person who is picking the crops. This includes steering and propulsion of the vehicle.

Summarized briefly but somewhat more specifically, a preferred embodiment of the invention has to do with an openwork frame or, alternatively, a framework characterized by top and bottom horizontal frames joined in vertically spaced relation by suitably paired struts or uprights. The top frame is spanned by a rigid panel at the median and rear portions and a readily attachable and detachable flexible canopy and these components considered together provide a practical roof. This roof overlies horizontal rails or track members on the lower portion of the framework which, in turn, support a nicely padded occupant supporting and position adjusting platform. The over-all framework is wheel supported, the wheels at the back or rear being driven from a prime mover and the wheels at the front being mounted for steering.

The prime mover or power plant is preferably an electrical motor operating motion transmitting means, the motion being delivered to a differential which in turn drives the ground-engaging wheels by sprocket wheels and sprocket chains trained thereover. The operating connection includes a magnetic or electrically operated brake which is under the control of a foot and leg operated rheostat adjustably mounted on one side at the rear of the occupant platform.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 2 is a top view of the vehicle in FIGURE 1, parts being broken away to illustrate obscured details of construction.

FIGURE 3 is a front elevational view of the vehicle in FIGURE 1, parts broken away in section.

FIGURE 4 is a rear elevational view of the vehicle.

FIGURE 5 is a longitudinal sectional view taken approximately on the line 5—5 of FIGURE 2.

FIGURE 6 is a sectional view showing a detail of construction and taken on the line 6—6 of FIGURE 2.

FIGURE 7 is an elevational view showing a part of a foot control and taken approximately on the line 7—7 of FIGURE 4.

FIGURE 8 is an enlarged fragmentary sectional view showing a detail of construction which renders the platform adjustable in a front and rear direction, the section being taken on the line 8—8 of FIGURE 2.

Figure 1:
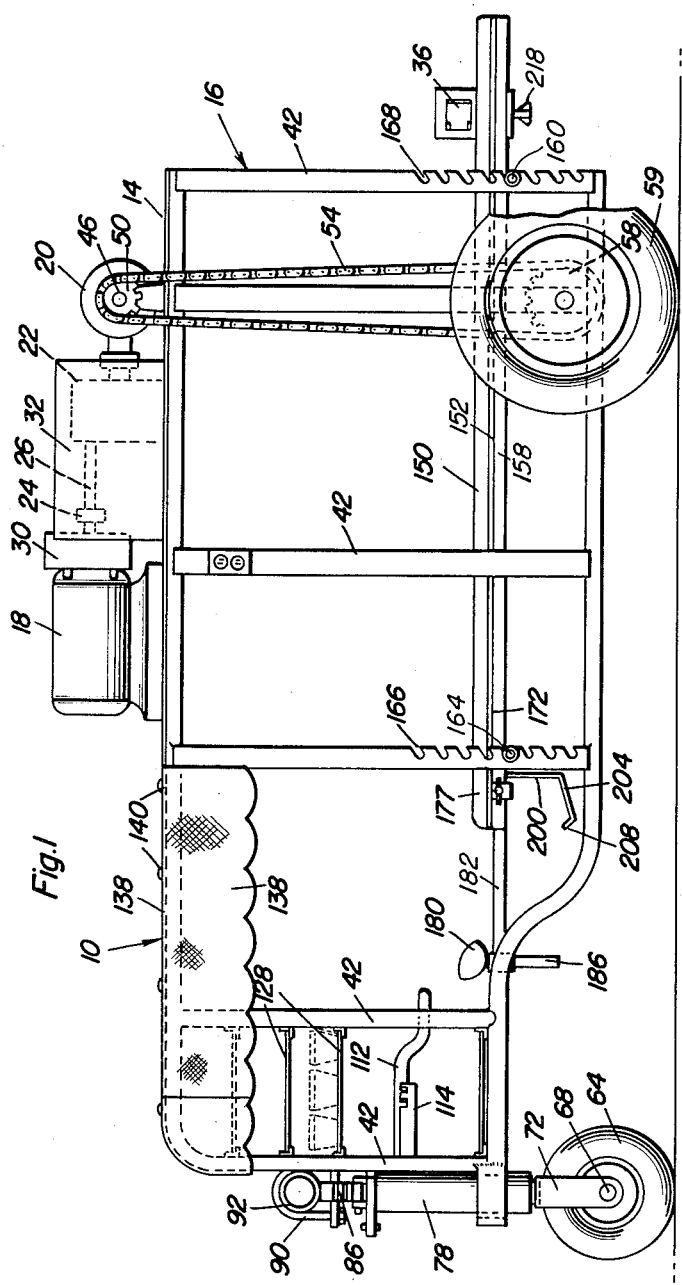
FIGURE 1 is a side elevational view of a vehicle in accordance with the invention.

In the accompanying drawings there is a vehicle 10 of the self-propelled type adapted to be moved through a field containing a crop which is to be harvested. The vehicle 10 embodies an openwork vehicle frame structure 12 having suitable and properly connected structural members to function as a support for the operating mechanism of the vehicle. The parts of the frame are identified in the order of occurrence in the description of the operating mechanism of the vehicle. There is a horizontal top panel 14 secured to an upper essentially horizontal sub-frame 16 of frame structure 12, and the panel provides a roof and also supports a motor 18 shown as an electric motor, although this may be replaced by an internal combustion engine. Where an electric motor is used, control and speed is more easily governed. It is pointed out that the motor, motor controls, and drive line to the differential case 20 are conventional, commercially available components which have been purchased and therefore the specific details are not shown. Diagrammatically, the motor operates through an electrically operated magnetic brake 30, and coupling 24 connected motor driven shaft 26, and actuates the mechanism of a speed reducer 22. Speed reducer 22, driven by shaft 26, drives the input shaft 28 that is operatively connected with the differential mechanism in differential case 20. Battery boxes 32 and 34 carried by a panel 14 energize the motor 18 by way of a control circuit (not shown) patterned strictly along the motor manufacturer's specification. The control circuit includes a forward and reverse switch 35 and a speed and brake control rheostat 36 (FIGURE 2) together with the electric brake operated by said rheostat 36, electric motor and batteries in the battery boxes 34 and 32.

The framework or structure 12 has a lower sub-frame 40 beneath but attached to the upper sub-frame by means of longitudinal spaced front, rear and intermediate uprights 42 which are secured to and extend between the upper and lower sub-frames 16 and 40, respectively. In the construction of this machine the differential case 20 and axle housings 21 and 23 were physically removed from an automobile and blocked up and mounted atop the panel 14. The axles extending from the differential in the differential case 20 are identified at 45 and 46, and chain sprockets 50 and 52 (FIG. 2) are secured to these axles. Chains 54 and 56 are arranged vertically and engaged with the sprockets 50 and 52 and are also engaged with sprockets 57 and 58 that ther secured to rear ground-engaging wheels 59 and 60.

Front wheels 62 and 64 are supported on short axles 66 and 68 that are carried by wheel forks 70 and 72. The two wheel forks are supported in an identical fashion and therefor only one is shown in sectional detail (FIGURE 3). Wheel fork 72 has a steering spindle 74 fixed to the upper part thereof and extending through bearings 75 and 76 that are carried by and located within tube 78. A transverse frame member 80 is fixed at its ends to tube 78 and to tube 79 which is identical to tube 78 but which functions as a part of the suspension assembly for fork 70. Frame member 80 has a pair of ears 82 near one end thereof and a pair of ears 84 near the other end thereof. A transverse elliptical spring 86 is connected by conventional spring shackles 88 to the pairs of ears 82 and 84 and connected by a U-bolt clamp 90 to a transverse frame member tube 92 which is fixed to a front pair of uprights 42 constituting two of the complement of uprights 42 that join the upper and lower sub-frames 16 and 40. Consequently, the front wheels and the supporting structure for these wheels are spring suspended by means of spring 86.

There is a steering mechanism connected to the spindles 74. The steering mechanism consists of a pair of tie-rods 96 and 98 secured at their outer ends to steering arms 100 and 102 which are rigidly secured to the upper end of spindles 74. The inner ends of the tie rods 98 and 96 are secured to a drag link 106 which is mounted by means of a short spindle 108 (FIGURE 5), for oscillatory movement in a bearing 110 formed in the transverse frame member 80. A lever 112 is connected by a pivot pin 113 to the lower end of spindle 108 and is operable in a locking quadrant 114 that is also fixed, for instance, by a hanger bracket 116 (FIGURE 5) to the transverse frame member 80. Locking quadrant 114 has a number of upwardly opening notches 119 within which the intermediate part of lever 112 seats and locks. However, the lever can be manually lifted, causing it to pivot about pin 113, and then turned to the left or the right thereby steering front wheels 62 and 64 through the steering mechanism that has been described in detail herein.

The forward uprights 42 have a pair of similar uprights 42 (FIGURE 5) parallel and adjacent thereto with a space 126 therebetween. A number of removable shelves 128 are supported in space 126. The shelves may be ordinary flat panels rested on pairs of confronting angles 130 which are fixed to the forwardmost uprights 42 and the adjacent uprights 42. Baskets 132 or other types of containers are supported on the shelves, and the shelves are made removable so that larger or smaller baskets or other containers may be easily accommodated. A canopy or roof covering 136 is attached to the upper sub-frame 16 and has a short awning skirt 138 extending downward therefrom. The awning roof 136 is preferably removable and therefore snaps 140 are diagrammatically indicated in FIGURE 5. The purpose of the awning is not only to protect the contents of the containers or baskets 132 but also cooperate with the panel 14 in shielding the occupant of the vehicle from direct sun rays.

The vehicle occupant is the picker. He assumes a prone position on the padded platform 150. The platform is made of a panel 152 having a soft padding or cushion 154 thereon protected by a suitably attached waterproof covering. Platform 150 is vertically adjustable and also horizontally adjustable. Accordingly, the platform panel 150 has a pair of angle rails 158 along the opposite longitudinal edges thereof, and there are transverse bars 160 and 162 fixed to the lower edges of these rails. The bars have stops 164, for instance, collars or washers welded or otherwise fastened in place near the ends thereof. The bars are removably disposed in downwardly slanted notches 166 and 168 formed in the rear uprights 42 and in a pair of intermediate uprights 42. It is now evident that the platform 150 may be lifted or lowered to a selected elevation and the bars or rods 160 and 162 engage in a selected notch 166 at the front part of the platform and 168 at the rear part of the platform.

Platform 150 was said to be horizoontally adjustable. This may be achieved in a number of ways, one of which is to simply have telescoping tubes connected together in an obvious way at the base panel 152 of the platform and to the rods 160. Another way is shown in FIGURE 8. Base panel 152 has a built-up channel (or a one-piece channel) 172 secured thereto, as by welds 174. Channel 172 embraces rail 158 which has rod 160 fixed thereto. Setscrew 177 is threaded through an opening 178 in channel 172 and engages the outer surface of rail 158. There is a construction identical to this on each side of platform 150. Setscrew 177 can be loosened and the platform plus the channels 172 slid forward or rearward with respect to the rails 158 and rods 160 and 162. This will position the forward part of the platform either closer or farther away from the transverse headrest 180.

The transverse headrest 180 is suitably padded and protectively covered and is an important part of the machine. It is in front of the forward edge of the platform 150, leaving a space 182 for the hands and arms of the picker. The headrest 180 embodies a padded suitably covered panel or strip 184 having depending rods 186 and 188 attached thereto and passed through bearings 190 and 192 which are secured to the forward ends of rails 158. There are means for adjustably securing the rods 186 and 188 in the bearings, for example, setscrews 196, (FIGURE 6) carried by typical bearing 192 and engaging the surface of typical rod 186.

For convenience of the picker, there is a depending bracket 200 connected by screws 202 (FIGURE 2) or otherwise secured to the bottom of platform panel 152. Bracket 200 is essentially L-shaped with the lower wall 204 thereof angled downwardly and forwardly slightly so that a container 132 resting thereon tends to slide forward slightly against the upstanding lip 208 at the forward edge of the bottom 204. During picking the picker need only lift the harvested crop a short distance and drop it into the container 132.

Although the electric circuit for motor 18 was said to be absolutely conventional, I have made a structural improvement dealing with the convenience of the occupant of platform 150 insofar as the location of rheostat 36 is concerned. The rheostat is both vertically and horizontally adjustable and is carried by rail 158. It is located to one side near the rear part of rail 158 so that it may be operated by the foot or leg of the occupant of platform 150. The adjustment is achieved by means of a bracket 210 (FIGURE 7) which has a rear wall 212 with an inwardly extending lower wall 214 integral therewith. There is a wall 216 parallel to wall 214 that forms an inwardly directed pocket within which rail 158 is received. Lower setscrew 218 is threaded in an opening in wall 214 and engages the lower edge of rail 158. The upper wall 216 fits over the channel 172 whereby the bracket 210 is horizontally adjustable with respect to platform 150.

The upstanding wall 212 has a pair of slots 222 and 224 through which bolts 226 and 228 pass. These bolts have nuts 229 and 230 thereon and are secured to rheostat 36. Consequently, the rheostat may be raised and lowered and tightened in place to suit the convenience of the picker.

As is evident, the single occupant (the operator as well as the picker) assumes a prone face-down position atop the cushioned platform 150 after the platform has been appropriately adjusted (vertically and horizontally) to the desired horizontal plane. The conveniently located brake controlling rheostat 36, after having been properly adjusted and located, enables the occupant to reliably control the speed and movement of the machine, using his right leg or foot to do so. The position of the headrest 180 is adjusted for comfort and convenience. With his head, shoulders and arms ahead of the leading or forward edge of the platform he is ready to do the picking job quite effectively. Both hands are free to operate the buttons on switch 35 and are available to pick or harvest low growing vegetables, berries by way of the space 182 (or to weed or transplant, as the case may be). Using this self-contained power propelled machine the picker's efficiency is increased from 200 to 300 percent over that of a walk-along picker bending and stooping, as is obvious. Then, too, it will be observed that the handle of the lever 112 is at the right height and in an ever-available position, just ahead of the headrest. After the steering lever has been set it stays put permitting travel of the machine along a given line or path necessitating only occasional correction for expected deviations. Consequently, both hands are free to operate in the unobstructed space 182.

The readily applicable and removable canopy or cover 136 in conjunction with the top panel 14 provides the desired overhead protection. Also the panel 14 provides a firm foundation or base for the accessible motor 18, differential means and the coacting motion transmitting connection or means therebetween. Battery power, as is evident, is highly desirable and quite economical. It follows that the herein disclosed self-contained machine adequately serves the purposes for which it is intended.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. For use in facilitating manual harvesting of low growing crops, a mobile vehicle comprising a frame, wheels, means operatively supporting said wheels on said frame, an elongated horizontally disposed platform, means connected with the platform and said frame for adjustably securing the platform on said frame, a container supporting bracket connected with said platform and shiftable in unison with said platform, said bracket depending below said platform and being accessible from the front part of said platform by a picker lying on said platform, a headrest carried by said frame and positioned in advance of said front part, means connected with said headrest for locking the headrest in a selected elevated position, steering means operatively connected with a pair of steering wheels located at the front of said frame, said means including a steering lever located adjacent to and directly in front of said headrest so that the picker may reach the steering lever, propulsion means connected with at least one of said wheels and carried by said frame, and a control device adapted to be operatively connected with said propulsion means and mounted adjacent to the rear end of said platform so as to be under the control of a foot of the picker.

2. The machine of claim 1 and in combination, an adjustable mounting bracket to which said control device is secured, said mounting bracket being adjustably attached to a longitudinal side portion of said platform.

3. The machine of claim 2 wherein means are provided for selectively locking said platform in an appropriately adjusted position lengthwise in respect to said frame.

4. For use in suspending and conveying an operator-picker in a relatively low plane just above the crop which is being harvested, a harvesting machine comprising an openwork frame structure having forward, rearward and intermediate portions, a prime mover mounted on said frame structure, rearward ground engaging wheels mounted for operation on the rearward end portion of the frame structure, a motion transmitting and operating connection between the prime mover and rear wheels, guiding and steering wheels operatively supported for steerable use on the forward portion of said frame structure, an elongated horizontally disposed platform on which the occupant lies prone and face down, means for adjustably supporting the platform on and within the confines of the frame structure and permitting the platform to be shifted forwardly or rearwardly or lifted and lowered vertically, a container supporting bracket suspended beneath the leading end portion of the platform and readily accessible to the occupant of the platform, a vertically adjustable headrest supported on the platform and spaced forwardly of said leading end, a manually regulatable steering lever having a forward end pivotally and operatively connected to the front wheels and having a rearward end disposed quadrant on said frame structure having keeper notches, in a plane slightly above the plane of the platform, a fixed a portion of said lever being releasably engageable with the keeper notches, and said headrest being spaced rearwardly from the rearward end of the lever, said frame structure embodying a horizontally disposed top frame, a horizontally disposed bottom frame disposed beneath the top frame, and forward, rearward and intermediate uprights constituting struts and connecting said top and bottom frames in rigid cooperative relationship, a forward portion of the top frame being provided with a readily attachable and detachable canopy, the median and rearward portion of the top frame being spanned and covered by a rigid top panel, said panel and canopy together providing a roof for the over-all frame structure, said panel being rigid and providing a base serving as a support for the prime mover and adjacent components of the operating connection between the prime mover and the rear ground engaging wheels.

5. For use in suspending and conveying an operator-picker in a relatively low plane just above the crop which is being harvested, a harvesting machine comprising an openwork frame structure having forward, rearward and intermediate portions, an electrically operated motor mounted atop said frame structure, rearward ground engaging wheels mounted for operation on the rearward end portion of the frame structure, a motion transmitting and operating connection between said motor and rear wheels, guiding and steering wheels operatively supported for steerable use on the forward portion of said frame structure, an elongated horizontally disposed platform on which the occupant lies prone and face down, rail means adjustably supporting the platform on the frame structure permitting the platform to be shifted forwardly or rearwardly or lifted and lowered vertically relative to said frame structure, an elongated work supporting rack suspended horizontally beneath the leading end portion of the platform and readily accessible to the occupant of the platform, a vertically adjustable headrest supported by and spaced forwardly of the forward edge of the platform, a manually regulatable steering lever having a forward end pivotally and operatively connected to the front wheels and having a rearward operating end disposed in a plane slightly above the plane of the platform, a fixed quadrant on said frame structure having keeper notches, a portion of said lever being releasably engageable with the keeper notches, said headrest being spaced rearwardly from the rearward end of the lever, a leg and foot operated speed controlling rheostat adjustable on one side of a rear end portion of said platform, and switch means mounted beneath and on the forward end portion of the platform and protectively covered by an overhanging portion of the platform and accessible to the occupant of the platform and adapted to be operatively connected with said prime mover.

6. For use in suspending and conveying an operator-picker in a relatively low plane just above the crop which is being harvested, a harvesting machine comprising an openwork frame structure having forward, rearward and intermediate portions, an electrically operated motor mounted atop said frame structure, rearward ground engaging wheels mounted for operation on the rearward end portion of the frame structure, a motion transmitting and operating connection between said motor and rear wheels, guiding and steering wheels operatively supported for steerable use on the forward portion of said frame structure, an elongated horizontally disposed platform on which the occupant lies prone and face down, rail means adjustably supporting the platform on the frame structure permitting the platform to be shifted forwardly or rearwardly or lifted and lowered vertically relative to said frame structure, an elongated work supporting rack suspended horizontally beneath the leading end portion of the platform and readily accessible to the occupant of the platform, said rail means embodying a pair of spaced rails in alignment with the lengthwise sides of the platform and having forward ends extending forwardly and beyond the forward portion of said platform, a headrest spanning the space between the forward ends of the rails and vertically adjustable on said forward ends, said headrest being of a length equal to the transverse width of the platform and the forward end of the platform being adjustable toward and from said headrest, a manually regulatable steering lever having a forward end pivotally and operatively connected to the front wheels and having a rear operating end disposed in a plane slightly above the median portion of said headrest, fixed means on said frame structure for retaining the rearward operating end of the lever in desired laterally adjusted positions, and a bracket on one longitudinal side of the platform adjacent the rearward end of the platform, said bracket being longitudinally adjustable and having a portion projecting above the platform which is adapted to support a leg and foot operated speed controlling rheostat.

References Cited in the file of this patent

UNITED STATES PATENTS

| | | |
|---|---|---|
| 786,995 | Richardson | Apr. 11, 1905 |
| 919,865 | Holden | Apr. 27, 1909 |
| 1,213,151 | Cayo | Jan. 23, 1917 |
| 1,368,892 | Carr | Feb. 15, 1921 |
| 2,317,606 | Harris | Apr. 27, 1943 |
| 2,378,847 | Harris | June 19, 1947 |
| 2,518,418 | Chickering et al. | Aug. 8, 1950 |
| 2,565,038 | McCurtain | Aug. 21, 1951 |
| 2,583,358 | Cesan | Jan. 22, 1952 |
| 2,627,611 | Nichols | Feb. 10, 1953 |
| 2,738,200 | DeHaven | Mar. 13, 1956 |
| 2,758,660 | Bouffort | Aug. 14, 1956 |
| 2,825,273 | Faucheux | Mar. 4, 1958 |